United States Patent
Vanek et al.

(10) Patent No.: US 12,293,653 B2
(45) Date of Patent: May 6, 2025

(54) VISUAL INDICATION OF TANK LEVEL AND PERFORMANCE

(71) Applicant: Reign RMC LLC, Summerland Key, FL (US)

(72) Inventors: Richard J. Vanek, Summerland Key, FL (US); Rodney Montrose, Pensacola, FL (US); Donald Conner, El Dorado, AR (US)

(73) Assignee: Reign 1 LLC, Big Pine Key, FL (US)

( * ) Notice: Subject to any disclaimer, the term of this patent is extended or adjusted under 35 U.S.C. 154(b) by 0 days.

(21) Appl. No.: 18/108,508

(22) Filed: Feb. 10, 2023

(65) Prior Publication Data

US 2024/0029527 A1 Jan. 25, 2024

Related U.S. Application Data

(60) Provisional application No. 63/431,017, filed on Dec. 7, 2022.

(51) Int. Cl.
*G08B 5/36* (2006.01)
*G01F 23/00* (2022.01)

(52) U.S. Cl.
CPC .......... *G08B 5/36* (2013.01); *G01F 23/0007* (2013.01)

(58) Field of Classification Search
CPC ........................ G08B 5/36; G01F 23/0007
See application file for complete search history.

(56) References Cited

U.S. PATENT DOCUMENTS

| 8,130,107 B2 * | 3/2012 | Meyer | G01M 3/28 73/40 |
| 2010/0134303 A1 * | 6/2010 | Perkins | A61M 5/1684 340/619 |
| 2013/0092851 A1 * | 4/2013 | Sakiya | G01F 23/18 250/577 |
| 2021/0003443 A1 * | 1/2021 | Curry | G01F 23/02 |

FOREIGN PATENT DOCUMENTS

CA           2021503 A1 *  1/1991

\* cited by examiner

*Primary Examiner* — David Z Huang
(74) *Attorney, Agent, or Firm* — AdamsIP, LLC

(57) ABSTRACT

Embodiments herein disclose a system for visually displaying information related to a fluid level in an above-ground storage tank, which may be enhanced to visually indicate the performance of selected tank sub-system(s). The system includes the above-ground storage tank adapted to store fluid, having a first sensor located in the tank. The sensor is in communication with a fluid indicator that provides a visual indication of a tank-level via a plurality of lights arranged proximate to an exterior surface of the above-ground storage tank. The plurality of lights are arranged so that when a first proportion of a light is electrified and illuminate, the illumination visually indicates a first detected fluid level.

20 Claims, 11 Drawing Sheets

VISUAL INDICATION OF TANK LEVEL AND PERFORMANCE

This Non-Provisional patent application claims priority from U.S. Provisional Patent Application No. 63/431,017 filed on Dec. 7, 2022 entitled Visual Indication of Tank Level, to common inventor Richard J. Vanek.

TECHNICAL FIELD

The invention generally relates to oil field storage tanks for oil and wastewater, and more specifically to a system and a method for demonstrating a level of fluid in an oil field storage tank.

Problem Statement and History

Interpretation Considerations

This section describes technical field in detail and discusses problems encountered in the technical field. Therefore, statements in the section are not to be construed as prior art.

Discussion of History of the Problem

Determining a level of fluid in a tank—such as an above-ground storage tank 100 as depicted in FIG. 1, a battery of tanks 200 as depicted in FIG. 2, a frac tank 200a as depicted in FIG. 2a or the like—used to hold liquids such as chemicals, brine water, fresh water, and/or oil, for example, in environments are far-ranging as dry oilfields to wet costal refineries and logistical hubs, has long been a frustration. Typically, a pump truck having a large storage unit must physically visit each tank, and a person must physically inspect the tank to determine the fluid level (or liquid level) in the tank. Alternatively, a person may approach a tank to read a mechanical or electrical screen or gauge. Sometimes, this process is so cumbersome that it requires a person to view the tank fluid level through a window in or near the top of the tank, or requires that a person physically climb up the outside of the tank and gauge the tank level by dropping a weighted line into the tank to determine the liquid level. What's more is that even when a dark tank level indicator is present, it is difficult to see (especially at night), and mechanical tank level indicators are notoriously unreliable. Indeed, field-techs and "roustabouts" are so encumbered by the gathering of tank level data that they rarely also monitor the performance and operation of tanks and related tank systems, such as pumps, sensors, and the like, in a single tank inspection.

Accordingly, the process of visually inspecting the tank is difficult—whether in the heat of a Texas summer, the cold of a North Dakota winter, or the wet-and-salty winds of the New Jersey Shore. It required the pumper or roustabout to get out of their vehicle and personally visit the tank. Further, climbing up and down the tank is clearly hazardous, and so is exposing oneself to the gasses and vapors that accumulate in the tank itself (indeed, fatalities have been reported from exposure to tank gasses, and the accumulated health-hazards from repeated exposures are still being studied).

Accordingly, there is a need for systems, methods and devices that provide for faster, more reliable tank level and performance monitoring. The present invention provides elegant solutions to these and other problems associated with monitoring fluid levels in, and the performance of, fluid tanks.

SUMMARY

One inventive device is a visual strip (visual indication device) of lighting having multiple lights. Each light is associated with a condition in an above-ground storage tank ("AGST or AST"), such as a fluid level, fluid type, the performance of a mechanical system, the performance of an electronic system, for example. The device couples to the AGST via a mounting unit/bracket, which may be coupled to the tank by common mechanical or electro-mechanical means, including fasteners, magnetics, and is in communication with at least one sensor, such as a fluid-level sensor, a fluid-flow sensor, a fluid-type-detection sensor, or other commercially available sensors.

One inventive system includes an above-ground storage tank adapted to store a predefined level of a fluid, and a sensor located at the above-ground storage tank. The sensor is adapted to detect a first level of a first fluid to define a first detected fluid level, where the sensor is in communication with a fluid indicator. The fluid indicator includes a plurality of lights arranged proximate to an exterior surface of the above-ground storage tank, where the plurality of lights is arranged such that when a first proportion of a light is electrified and display a first color, the display visually indicates the first detected fluid level. The plurality of lights is arranged linearly and vertically up-and-down on the exterior surface of the above-ground storage tank.

The system further includes a power source coupled to a controller in communication with the sensor and the fluid indicator, where the controller is communicatively coupled with one of a server and/or a user device. The server and user device are preferably adapted to generate a first communication message to a user (such as an operator, field technician, roust-about, field surveyor, or centralized manager), where the first communication message comprises a warning related to a predefined unsafe condition.

The above is simply a selected summary, and not a complete description of the invention. The invention is defined by the claims with details supported by this specification and drawings.

BRIEF DESCRIPTION OF THE DRAWINGS

Various aspects of the invention and its embodiment are better understood by referring to the following detailed description. To understand the invention, the detailed description should be read in conjunction with the drawings.

DESCRIPTION OF AN EXEMPLARY PREFERRED EMBODIMENT INTERPRETATION CONSIDERATIONS

Figure 1:
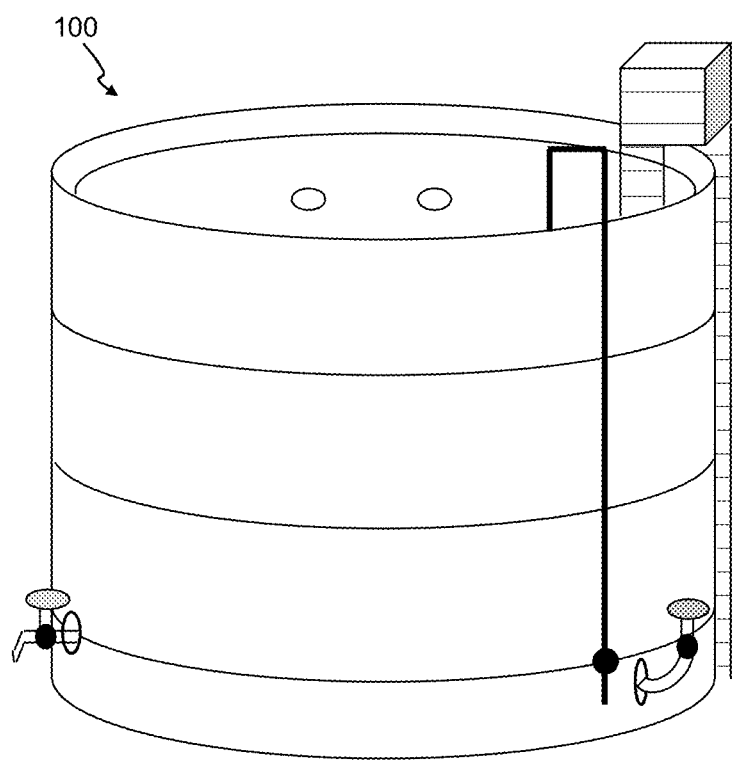
FIG. 1 illustrates an existing above-ground storage tank.
Figure 2:
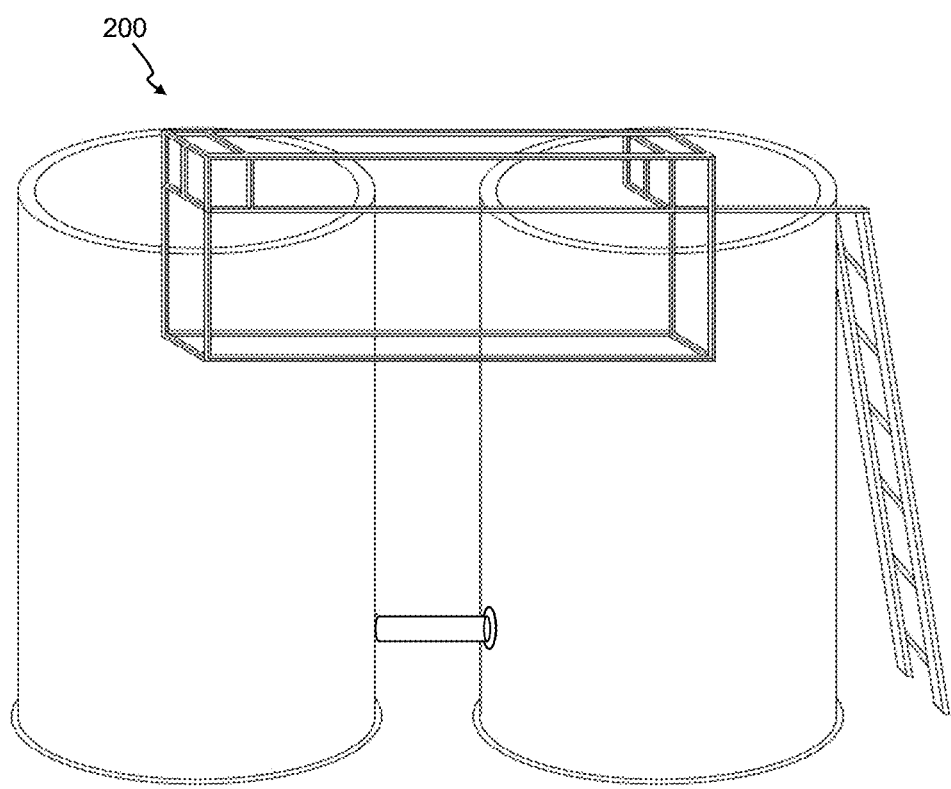
FIG. 2 illustrates an existing battery tank.
Figure 2A:
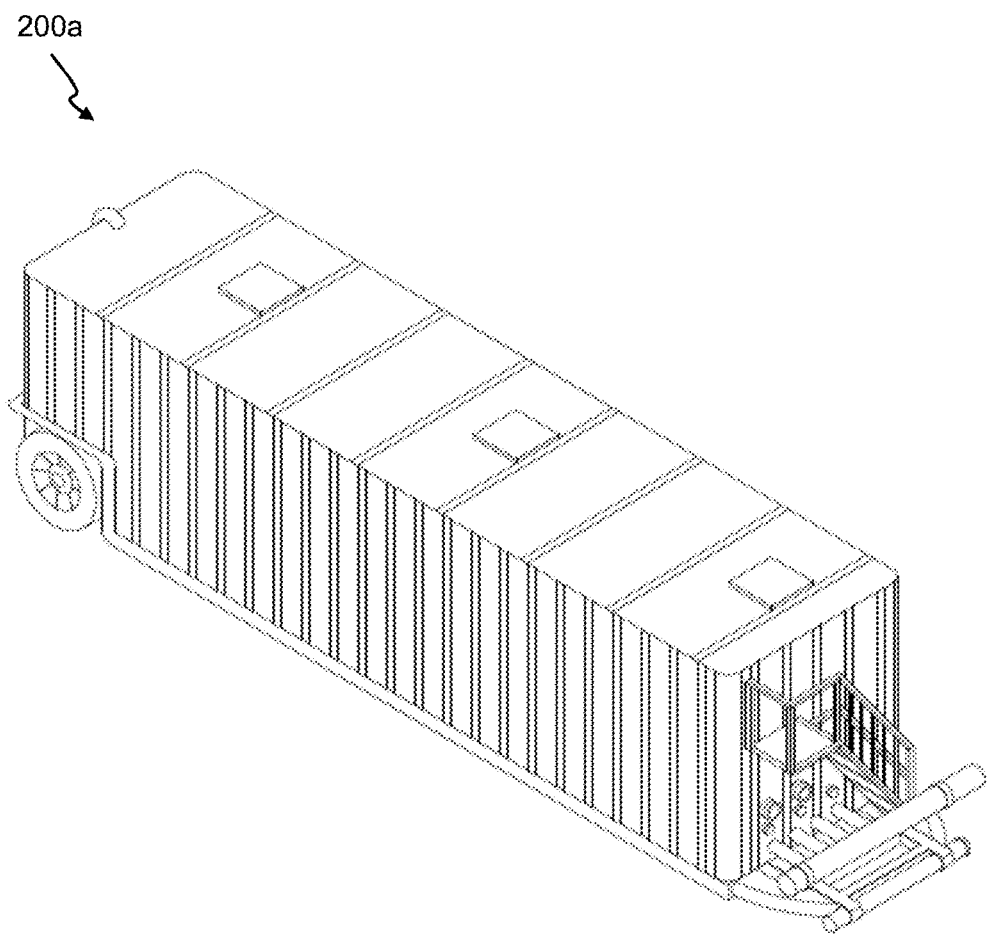
FIG. 2a illustrates an existing frac tank.

While reading this section (Description of An Exemplary Preferred Embodiment, which describes the exemplary embodiment of the best mode of the invention, hereinafter referred to as "exemplary embodiment"), one should consider the exemplary embodiment as the best mode for practicing the invention during filing of the patent in accordance with the inventor's belief. As a person with ordinary skills in the art may recognize substantially equivalent structures or substantially equivalent acts to achieve the same results in the same manner, or in a dissimilar manner, the exemplary embodiment should not be interpreted as limiting the invention to one embodiment.

The discussion of a species (or a specific item) invokes the genus (the class of items) to which the species belongs as well as related species in this genus. Similarly, the recitation of a genus invokes the species known in the art. Furthermore, as technology develops, numerous additional alternatives to achieve an aspect of the invention may arise. Such advances are incorporated within their respective genus and should be recognized as being functionally equivalent or structurally equivalent to the aspect shown or described.

A function or an act should be interpreted as incorporating all modes of performing the function or act, unless otherwise explicitly stated. For instance, sheet drying may be performed through dry or wet heat application, or by using microwaves. Therefore, the use of the word "paper drying" invokes "dry heating" or "wet heating" and all other modes of this word and similar words such as "pressure heating".

Unless explicitly stated otherwise, conjunctive words (such as "or", "and", "including", or "comprising") should be interpreted in the inclusive and not the exclusive sense.

As will be understood by those of the ordinary skill in the art, various structures and devices are depicted in the block diagram to not obscure the invention. In the following discussion, acts with similar names are performed in similar manners, unless otherwise stated.

The foregoing discussions and definitions are provided for clarification purposes and are not limiting. Words and phrases are to be accorded their ordinary, plain meaning, unless indicated otherwise.

DESCRIPTION OF THE DRAWINGS, A PREFERRED EMBODIMENT

The present invention discloses a system for displaying information related to a fluid level in an above-ground storage tank, the system includes sub-systems and elements as shown and described below. Advantageously, the present invention assists in displaying information related to the fluid level in the above-ground storage tank in a simple, quick and cost-effective way. The proposed system avoids an operator intervention (or user intervention) for determining the fluid level in the above-ground storage tank and enhances the safety of the operator.

TABLE

LIST OF REFERENCE NUMERALS

| Reference Numeral | Element Name |
| --- | --- |
| 100 | Existing above-ground storage tank (AST) |
| 200 | Existing battery tank |
| 200a | Existing frac tank |
| 300 | System (First system) |
| 400 | System (Second system) |
| 305 and 355 | At least one sensor |
| 310 and 350 | Above-ground storage tank |
| 315 | Fluid indicator (fluid strip) |
| 320 | First connecting unit |
| 325a-325c | Plurality of lights |
| 330 | Fluid indicator track |
| 335 | Mounting unit (aka "mounting bracket") |
| 340a | First base unit |
| 340b | Second base unit |
| 345a | Second connecting unit |
| 345b | Third connecting unit |
| 360 | Level of first fluid |
| 365 | Level of second fluid |
| 370 | Empty portion |
| 500 | Example environment |
| 505 | Communications network |
| 510 | User device |
| 515 | Server/cloud |
| 600 | Exploded view |
| 610 | Visual indication unit (visual indication device) |
| 700 | Wiring diagram |
| 710 | Processor |
| 712 | Controller |
| 714 | Transceiver |
| 720 | Power source |
| 800 | Example segmented fluid indicator |
| 900 | Example continuous fluid indicator |
| 1000 | Flow Chart |
| 1010 | First fluid detection act |
| 1020 | First fluid level detection act |
| 1030 | First fluid level communication act |
| 1040 | Light activation act |
| 1050 | Light deactivation act |

Figure 3:
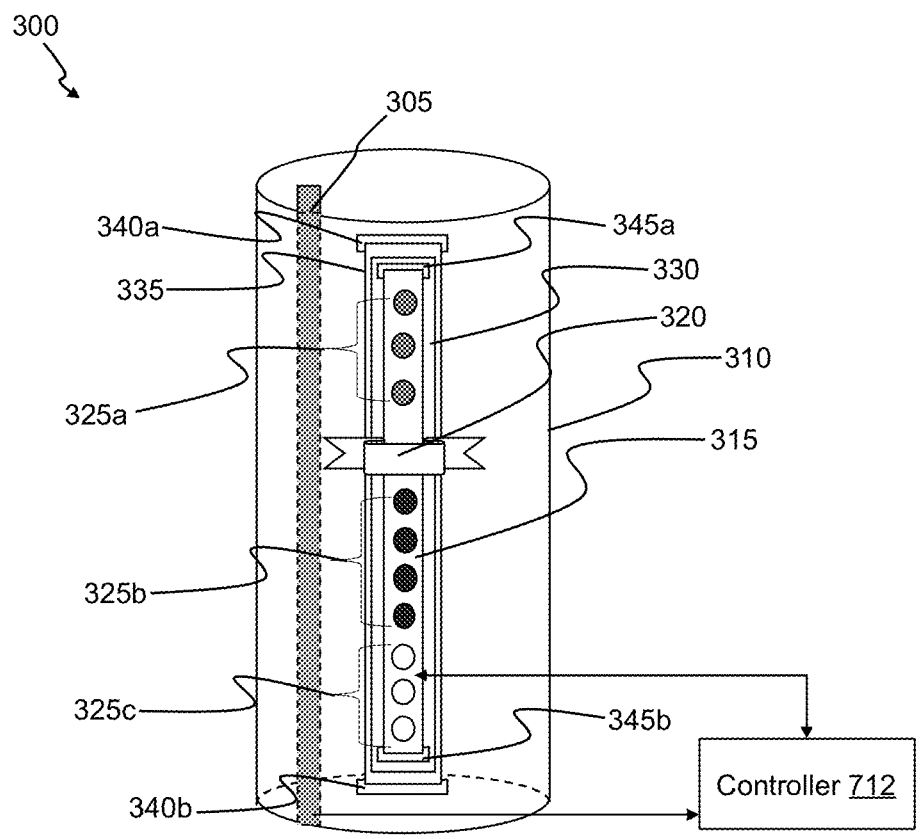
FIG. 3 illustrates a first system for displaying information related to a fluid level in an above-ground storage tank.
Figure 4:
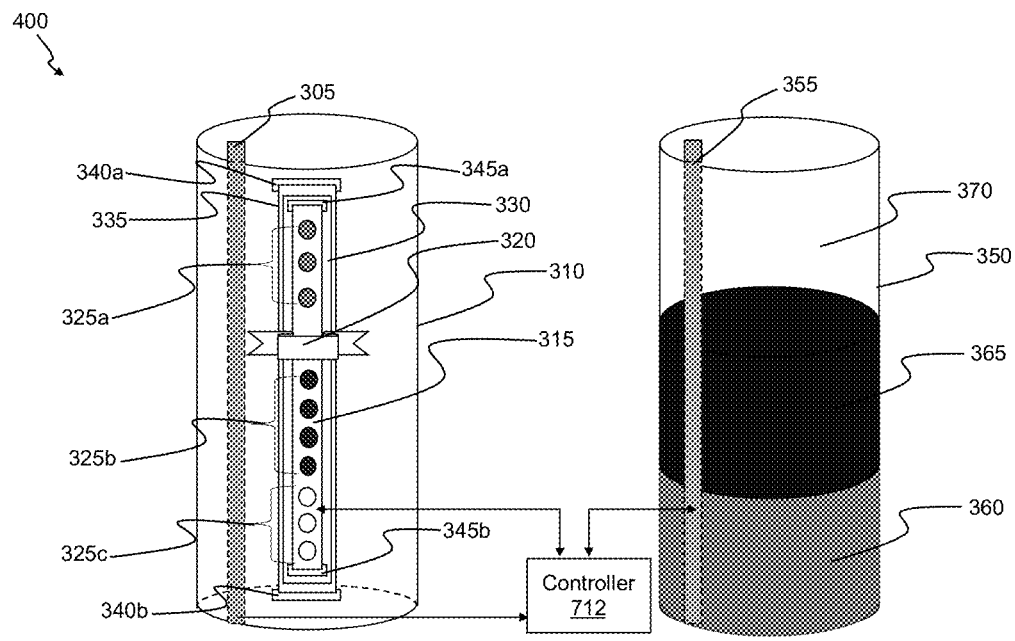
FIG. 4 illustrates an example environment for displaying the information related to the fluid level in the above-ground storage tank with multiple liquids (oil and water) in the same tank.
Figure 5:
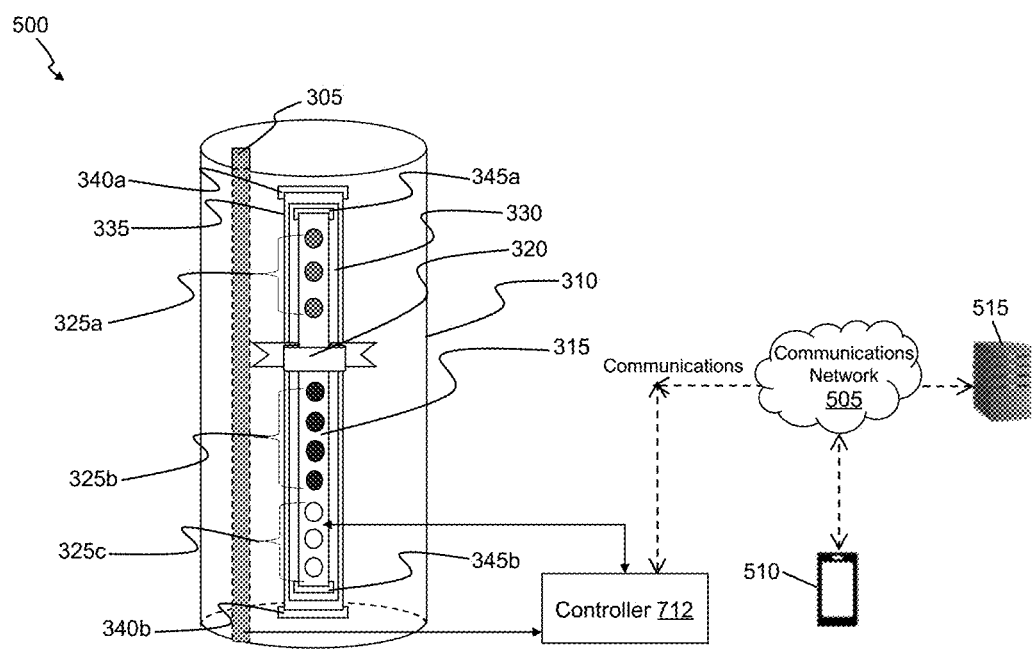
FIG. 5 illustrates an example of a system for displaying information related to a fluid level in an above-ground storage tank, and sending the level information to a remote communications network for storage on a server and communication to a user via a web page or mobile application.
Figure 6:
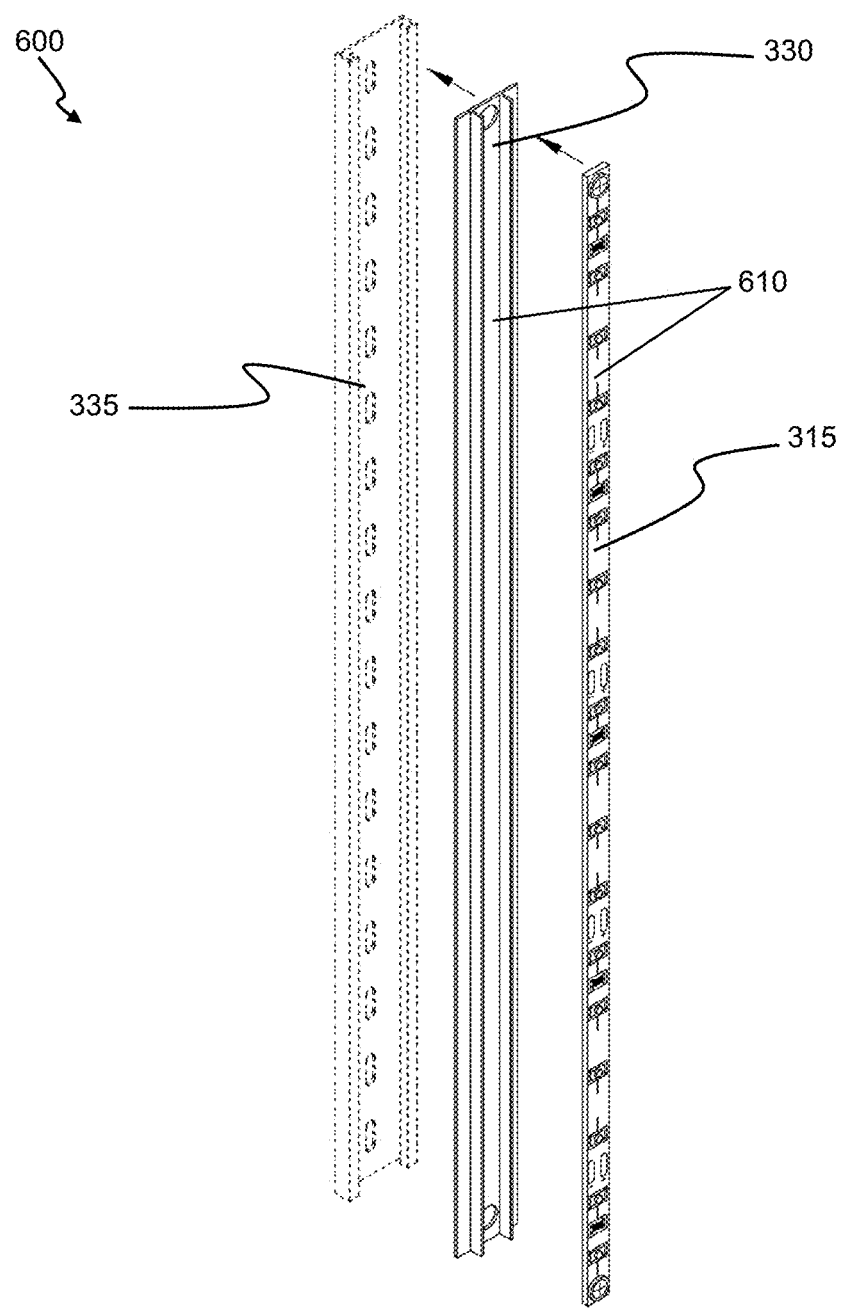
FIG. 6 illustrates an exploded view depicting a visual indication unit having a fluid indicator, and a fluid indicator track, and a mounting unit for mounting the visual indication unit on the above-ground storage tank.
Figure 7:
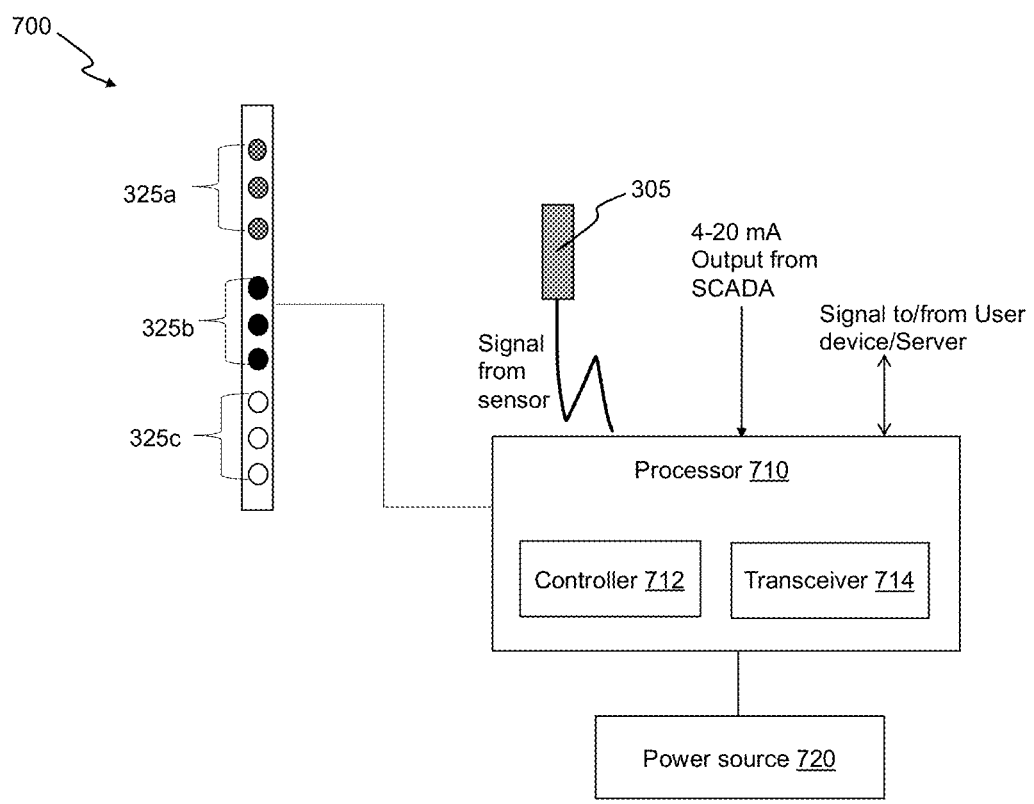
FIG. 7 is a wiring diagram illustrating the fluid indicator coupled with a processor and a power source. This illustrates that the tank level can be communicated by either reading a local sensor, or receiving a signal from a remote tank monitoring system (the example uses a 4-20 mA analog signal from a Supervisor Control And Data Acquisition (SCADA), though other implementations could be used), and showing the optional Transceiver 714 used to communicate with the Server or User Device.
Figure 8:
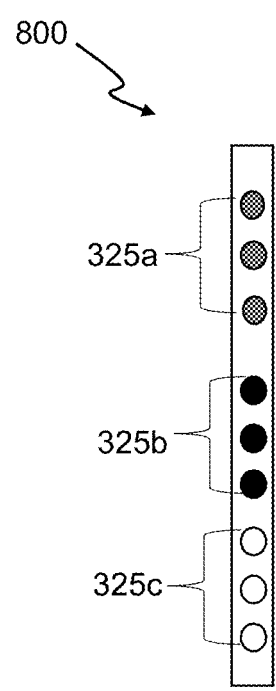
FIG. 8 illustrates an example segmented fluid indicator.
Figure 9:
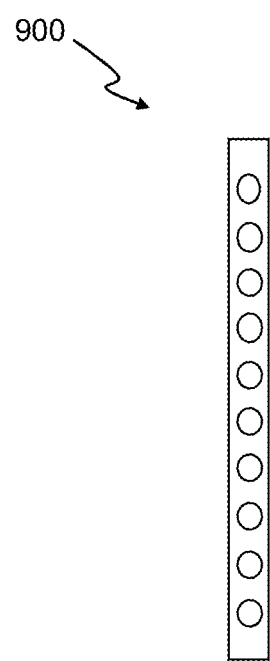
FIG. 9 illustrates an example continuous fluid indicator.

In opening, simultaneous reference is made to FIGS. 3 through 9, in which FIG. 3 illustrates an example system (aka "first system") 300 for displaying information related to a fluid level in an above-ground storage tank 310; FIG. 4 illustrates another example system (aka "second system") 400 for displaying the information related to the fluid level in the above-ground storage tanks 310, 350, where multiple fluid levels in the tanks are read; FIG. 5 illustrates an example environment 500 for displaying the information related to the fluid level in the above-ground storage tank 310 and communicating this to a Remote Server and/or User Device; FIG. 6 illustrates an exploded view 600 depicting a visual indication unit (aka "visual indication device") 610 having a fluid indicator 315, and a fluid indicator track 330 and a mounting unit 335 for mounting the visual indication unit 610 on the above-ground storage tank 310; FIG. 7 is a wiring diagram 700 illustrating the fluid indicator 315 coupled with a processor 710 and a power source 720, and reading the tank level from either Sensor 305 or receiving an external signal from a local Tank monitoring system. FIG. 8 illustrates an example segmented fluid indicator 800; and FIG. 9 illustrates an example continuous fluid indicator 900.

Referring to FIGS. 3 and 4, the systems 300, 400 and their components as disclosed below are made of at least one of steel, polymer, plastic, aluminum, fiberglass, polyethylene, or combination thereof. The systems 300, 400 comprise one or more sensor(s) 305, 355, one or more above-ground storage tank(s) 310, 350, a fluid indicator (or fluid strip) 315, a first connecting unit 320, a plurality of lights 325a-325c, a fluid indicator track 330, a mounting unit 335, a first base unit 340a, second base unit 340b, a second connecting unit 345a, and a third connecting unit 345b.

The one or more above-ground storage tank(s) 310, 350 stores a predefined level of a fluid. The one or more above-ground storage tank(s) 310, 350 is an industrial container used to store large quantities of fluids. In an embodiment, the predefined level of the fluid is between 400 gallons and 30,000,000 gallons. The fluid can be, for example, but not limited to, oil, petrol, diesel, liquid gas, fertilizer, wastewater or combination thereof. In an example, the one or more above-ground storage tank(s) 310, 350 stores a 500 gallons of petrol. In another example, the one or more above-ground storage tank(s) 310, 350 stores a 2000 gallons of petrol, wastewater and a liquid gas. In yet another example, the one or more above-ground storage tank(s) 310, 350 may also contain fertilizer(s) (known in the art) and/or a fluid. The shape of the one or more above-ground storage tank(s) 310, 350 may be cylindrical, circular, rectangular or square, for example. The systems 300, 400 are explained with respect to the one or more above-ground storage tank(s) 310, 350, but the present invention is not limited to the above-ground storage tanks only and is also applicable to other type of tanks (e.g., battery tank, wastewater storage tank, dry bulk storage tank, fire protection storage tank, frac tank, fixes angle tank, vertical tank or the like).

The one or more sensor(s) 305, 355 is located at the one or more above-ground storage tank(s) 310, 350. In an example, the one or more sensor(s) 305, 355 can be located at a bottom portion of an interior side of the one or more above-ground storage tank(s) 310, 350. In another example, the one or more sensor(s) 305, 355 can be located at a top portion of an exterior side of the one or more above-ground storage tank(s) 310, 350. In yet another example, a first sensor can be located at a top portion of an exterior side of the one or more above-ground storage tank(s) 310, 350 and a second sensor can be located at a center portion of an interior side of the one or more above-ground storage tank(s) 310, 350. In yet another example, the one or more sensor(s) 305, 355 can be dropped down using some wired connection into the one or more above-ground storage tank(s) 310, 350. In yet another example, the one or more sensor(s) 305, 355 can be attached to a ¼" National Pipe Taper (NPT) fitting at the bottom of the one or more above-ground storage tank(s) 310, 350. The placement of the one or more sensor(s) 305, 355 is not limited to the aforesaid examples and can be determined based on the implementation. The one or more sensor(s) 305, 355 can be, for example, but not limited to a liquid level sensor, a submerged hydrostatic pressure sensor, radar level sensor, ultrasonic level sensor, laser time of flight sensor, float level sensor, an $H_2S$ gas detection sensor, a temperature sensor, an oxygen level detection sensor, a local pressure sensor, a fluid flow sensor or the like. The one or more sensor(s) 305, 355 may be operated using at least one of an ultrasonic ranging technology, a radio ranging technology, and a light ranging technology. Alternatively, the one or more sensor(s) 305, 355 may be driven from an external 4-20 mA signal from a customer's Programmable Logic Controller (PLC) or a Supervisory Control and Data Acquisition (SCADA) system.

Broadly, the one or more sensor(s) 305, 355 is adapted to detect a presence of a fluid and a type of a fluid in the above-ground storage tank and to detect performance condition (first pump performance condition, for example) of mechanical elements of the systems 300, 400. Particularly, the one or more sensor(s) 305, 355 detects a first level 360 of a first fluid to define a first detected fluid level. Also, the one or more sensor(s) 305, 355 detects a level 365 of a second fluid in the above-ground storage tank(s) 310, 350. The one or more sensor(s) 305, 355 also detects an empty portion 370, if any, in the above ground storage tank(s) 310, 350. Although the fluid level detection has been described with respect to only the first fluid level and the second fluid level as shown in FIG. 4, however the one or more sensor(s) 305, 355 can detect multiple fluid levels (third fluid level, fourth fluid level, and so on so forth) without any limitations. The one or more sensor(s) 305, 355 is in communication with the fluid indicator 315 through a controller 712 (explained below in conjunction FIG. 7). Length of the fluid indicator 315 can be 5, 10, 15, 20, 25, 30 ft., for example. The length of the fluid indicator 315 may vary depending on the height of the one or more above-ground storage tank(s) 310, 350. The fluid indicator 315 includes the plurality of lights 325a-325c arranged proximate to an exterior surface of the one or more above-ground storage tank(s) 310, 350. The plurality of lights 325a-325c is arranged on the fluid indicator 315 such that when a first proportion of a light is electrified, it displays a first color, where the display visually indicates the first detected fluid level. The plurality of lights 325a-325c is arranged linearly and vertically up-and-down on the exterior surface of the one or more above-ground storage tank(s) 310, 350. Alternatively, the plurality of lights 325a-325c is arranged horizontally right-to-left on the exterior surface of the one or more above-ground storage tank(s) 310, 350. Alternatively, the plurality of lights 325a-325c is arranged circularly, diagonally, or the like at the exterior surface of the above-ground storage tank 310. The placement of the plurality of lights 325a-325c at the exterior surface of the one or more above-ground storage tank(s) 310, 350 is determined based on the implementation. The plurality of lights 325a-325c may be light emitting diode (LED) lights, liquid crystal display (LCD) lights, for example.

In an embodiment, a first color of the plurality of lights 325a-325c indicates at least one of a status of the first fluid and a type of the first fluid at a first defined volume, and a second color of the plurality of lights 325a-325c indicates a status of a second fluid and a type of the second fluid at a second defined volume. In an example, the status can be a presence of the first fluid. In another example, the status can be an absence of the first fluid. The type of the fluid can be determined by a density of the fluid and temperature level. The first fluid is in a liquid state or a gaseous state. The boundary between fluid 360 and fluid 365 defines a first fluid boundary, and the boundary between the fluid 365 and the atmosphere 370 defines a second fluid boundary being a fluid surface. Of course the number of fluid boundaries will vary based on the number of different fluids present, particular when they have varying densities (mass/volume); for example, oil will float on water.

In an embodiment, a predefined color of the plurality of lights 325a-325c indicates a first error in the systems 300, 400. In an alternative embodiment, the predefined color of the plurality of lights 325a-325c indicates a first known error type in the systems 300, 400. The first known error type can be, for example, but not limited to power shortage, short circuit, excessive heat generation.

The plurality of lights 325a-325c on the fluid indicator 315 may be turned OFF by default, and then triggered "ON" from a message (e.g., push message, a notification message, a SMS or the like) and be activated for a set period of time (for example, 5 minutes, 10 minutes). This avoids a risk associated with the plurality of lights 325a-325c being continuously ON, namely, making the one or more above-ground storage tank(s) 310, 350 and site a target for vandalism.

In order to save energy or power, the plurality of lights 325a-325c on the fluid indicator 315 may be programmed to only display the level for a small time period (for example, 10 seconds) and be OFF for a longer time period (say 5 minutes, seconds), so that the plurality of lights 325a-325c display would only be visible every 6 minutes.

In an embodiment, the one or more above-ground storage tank(s) 310, 350 may have multiple sensors that measure the fluid levels using dual interface (floats or radar), so that the fluid indicator 315 could allow dual 4-20 mA signals to drive the plurality of lights 325a-325c to indicate the status of the fluid levels.

The fluid indicator 315 can be, for example, but not limited to a continuous fluid indicator 900 (as shown in FIG. 9), and a segmented fluid indicator 800 (as shown in FIG. 8). In an embodiment, one fluid indicator 315 (for example, continuous fluid indicator 900) may represent multiple tanks and a bottom light colors can change depending on a specific tank being identified. A further alternative is to have the top lights change color to represent the tank they are displaying (Red is equal to a first tank, Yellow is equal to a second tank, Green is equal to a third tank, for example) using the segmented fluid indicator 800. The display can sequence through the tank levels every few seconds. This would have several advantages such as the above-ground storage tanks are often arranged in rows, so they are not all visible from a single point of view. This provides a visual display of the hidden above-ground storage tanks and reduce the cost since a single fluid indicator 315 would be needed. Further, the advantage of a segmented fluid indicator 800 (for example, 5 segments) is that one may have a single color and just light the segments to represent the levels in the one or more above-ground storage tank(s) 310, 350 to allow quick visualization of the approximate state of the one or more above-ground storage tank(s) 310, 350. Often this is sufficient for the operator without knowing the exact level of the fluid(s) in the one or more above-ground storage tank(s) 310, 350. Further, any number of segments (one or more) can be used to indicate the tank levels, and there is not necessarily a 1:1 connection between the fluid indicator height and the tank. For example, a 3 ft fluid strip can display the level of a 25 ft tank. A user can plug in another LED segment (fluid strip) using a coupler, and then the 0-25 ft tank would be represented by two 3 ft LED light segments (or a 3 ft and 5 ft LED light segment), for example.

The fluid indicator 315 may have the ability to auto-program the light colors. For example, if the fluid indicator 315 is a part of a larger monitoring system (not shown), it can change the colors of the entire length of the fluid indicator 315 to a specific color to represent a system error. Further, if the site lost AC (alternating current) power, or a pump motor tripped a breaker or entered/encountered another error preventing its operation, the fluid indicator 315 can turn all red colors. In one embodiment, this error color can alternate with the normal tank level display. The color coding of the lights of the fluid indicator 315 may be programmed via the controller 712.

In an embodiment, the one or more above-ground storage tank(s) 310, 350 may have a containment zone barrier designed to hold the tank's fluid if there is a tank leak. These barriers are often 12 to 24 inches or more in height. The fluid indicator 315 will need to be mounted at this height or above the height to allow visibility from outside the barrier, and if there is a leak, the fluid indicator 315 won't be immersed in the fluid.

In addition to the plurality of lights 325a-325c, the fluid indicator 315 may have other circuit arrangements necessary for visual indication of the tank level. The fluid indicator 315 may be directly installed on the one or more above-ground storage tank(s) 310, 350. The fluid indicator 315 is coupled to the exterior surface of the one or more above-ground storage tank(s) 310, 350 via the first connecting unit 320. The first connecting unit 320 can be, for example, but not limited to a magnet, clamp, coupler, hinge, fastener or the like. In an example, the fluid indicator 315 is coupled to the exterior surface of the steel-based one or more above-ground storage tank(s) 310, 350 via the magnet. This allows easy attachment and removal of the fluid indicator 315 from the steel-based one or more above-ground storage tank(s) 310, 350. In another example, for polymer based above-ground storage tank, the user can attach metal plates to the polymer based above-ground storage tank to allow mounting of the fluid indicator 315 and still have the capability of removal in an easy way.

Alternatively, the fluid indicator 315 having the plurality of lights 325a-325c may be installed on the one or more above-ground storage tank(s) 310, 350 by using the fluid indicator track 330 and the mounting unit 335. In such a case, the fluid indicator 315 is located/placed in the fluid indicator track 330, thereby forming the visual indication unit 610 as shown in FIGS. 3-6, where the fluid indicator 315 is located/placed in the fluid indicator track 330 using at least one of the second connecting unit 345a (e.g., joint clip, spring, fastener or the like) and the third connecting unit 345b (e.g., joint clip, spring, fastener or the like), and then the visual indication unit 610 is coupled to (or installed on) the one or more above-ground storage tank(s) 310, 350 by using the mounting unit 335 (e.g., uni-strut mounting system, metal bar or the like). The mounting unit 335 secures the visual indication unit 610 either due to its structure or by using a securing/connecting means (e.g., fasteners, clamps, magnets etc.). Then, the mounting unit 335 may be mounted on the one or more above-ground storage tank(s) 310, 350 using at least one of the first base unit 340a and the second base unit 340b. The first base unit 340a is coupled with an end (aka "first end") of the mounting unit 335 and the second base unit 340b is coupled with another end (aka "second end") of the mounting unit 335. The first base unit 340a is arranged opposite to the second base unit 340b. Alternatively, the base units can be replaced using other suitable connecting means, for example, magnets, clamps, fasteners, or the like. In addition to the mounting unit 335, the visual indication unit 610 may also utilize the first connecting unit 320 (as explained above) for installation on the one or more above-ground storage tank(s) 310, 350.

In an embodiment, the fluid indicator 315 having the plurality of lights 325a-325c and/or the fluid indicator track 330 may be secured under a cover (not shown). The cover acts as a protective element for the fluid indicator 315 and/or the fluid indicator track 330. The cover protects the fluid indicator 315 and/or the fluid indicator track 330 from poor weather conditions, vandalism, for example. The cover may be made from a polymeric material, fiber material, glass or any suitable material known to a person skilled in the art. The cover has a suitable shape so that it can secure the fluid indicator 315 and/or the fluid indicator track 330.

Now, simultaneously referring to FIGS. 5 and 7, the one or more sensor(s) 305, 355 and the fluid indicator 315 function with the help of the controller 712, wherein the controller 712 is communicatively and/or electrically coupled with the one or more sensor(s) 305, 355 and the fluid indicator 315. The controller 712 enables communication between the one or more sensor(s) 305, 355 and the fluid indicator 315. The controller 712 is adapted to activate the fluid indicator 315 having the plurality of lights 325a-325c for the predefined period of time (for example, 10 minutes) based on inputs from the one or more sensor(s) 305, 355. The controller 712 may be driven from an external 4-20 mA signal from a customer's Programmable Logic Controller (PLC) or a Supervisory Control and Data Acquisition (SCADA) system. The controller 712 may also be coupled with and driven by the power source 720 (e.g., AC supply, batteries, solar power, wind power or the like) (24V, for example) and coupled with a transceiver 714 (for receiving and transmitting signals), where the controller 712 and the transceiver 714 may be included/positioned in the processor 710 (e.g., multi-processor or the like) and where the processor 710 handles all the tasks associated with the visual indication of the tank level. The processor 710, hence the controller 712 may be positioned on the fluid indicator 315. Alternatively, the processor 710, hence the controller 712 may be placed as a stand-alone entity near/on the one or more above-ground storage tank(s) 310, 350. Alternatively, the processor 710, hence the controller 712 may be placed as a stand-alone entity remotely.

On the other hand, the controller 712 is communicatively coupled with one of a server 515 (e.g., edge server, cloud server or the like) and a user device 510 (e.g., mobile phone, laptop, smart phone, tablet, portable computer or any other computing device including similar hardened and field-specific devices) as shown in FIG. 5, where the controller 712 feeds the outputs of at least one of the one or more sensor(s) 305, 355 and the fluid indicator 315 to one of the server 515 and the user device 510 through the communications network 505. At least one of the one or more sensor(s) 305, 355 and the fluid indicator 315 may wirelessly send the exact level of the fluid in the one or more above-ground storage tank(s) 310, 350 to a web-based display (not shown) or a customer dashboard (not shown), or have a local display (not shown) that would report the exact reading of the fluid if further detail is needed to the operator through the controller 712. The server 515 may also communicate with the user device 510 through the communications network 505, which is preferably a wireless communications network such as a Long-Term Evolution (LTE), Fifth Generation Networks (5G), Wi-Fi networks and Long Range (LoRa) networks, for example. Of course, the communications network 505 comprises a wireline and/or fiber-optic based communications and data transmission. One of the server 515 and the user device 510 is adapted to generate the first communication message to the user, wherein the first communication message comprises a warning related to a predefined unsafe condition. In an example, one of the server 515 and the user device 510 enables the user to monitor environmental parameters, such as flow rate of the fluid, power consumption at the systems 300, 400, processing power at the systems 300, 400, or communication channel through the communications network 505 as shown FIGS. 5 and 7. Then, when a threshold is violated, an appropriate warning is communicated to the user/operator.

It may be noted that although the present invention shows various aforementioned elements and components, but it is to be understood that other alternatives are not limited thereon. Further, the labels or names of the elements/components are used only for illustration purposes and do not limit the scope of the present invention. The shape and size of the various elements in the aforementioned systems do not limit the scope of the present invention.

Figure 10:
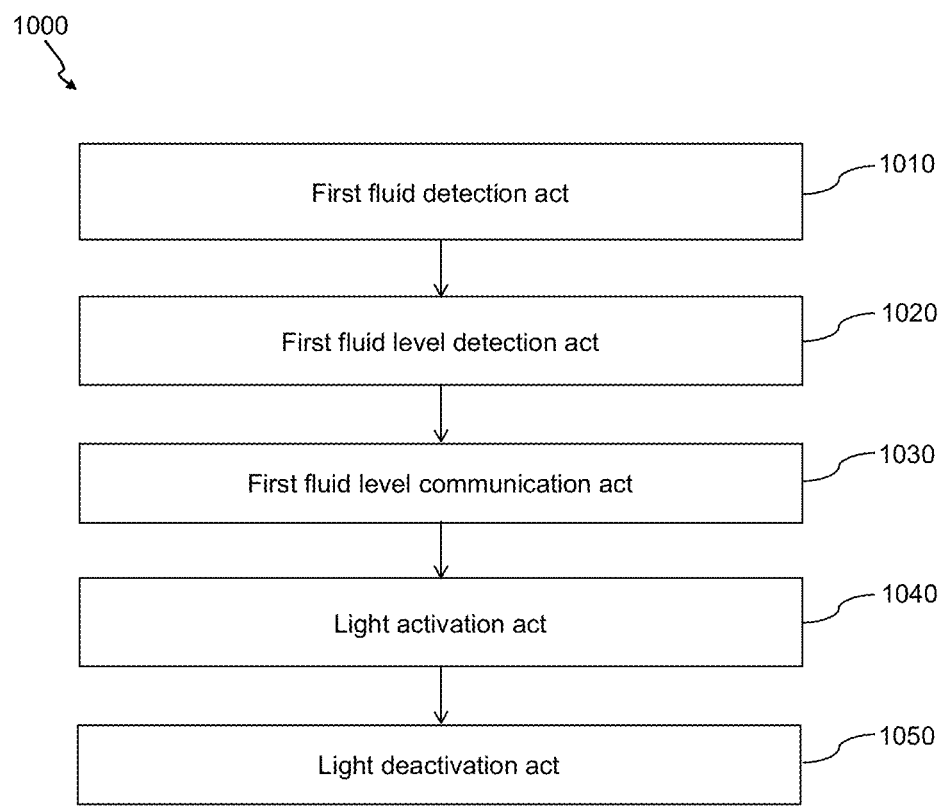
FIG. 10 is a flow chart illustrating a method for conveying information regarding a status of an interior volume of the above ground storage tank.

FIG. 10 is a flow chart 1000 illustrating a method for conveying information regarding a status of an interior volume of the above ground storage tank 310.

In a first fluid detection act 1010, the first sensor 305 detects the first fluid. In a first fluid level detection act 1020, the level of the first fluid is being detected using the first sensor 305. In a first fluid level communication act 1030, the first sensor 305 communicates the level of the first fluid to the fluid indicator 315.

Next, in a light activation act 1040, number of segments of the plurality of lights 325a-325c is determined and at least one light (and/or at least one segment) from the plurality of lights 325a-325c gets activated to display a predetermined color associated with the first fluid and the first level of the first fluid. In a light deactivation act 1050, the at least one light from the plurality of lights 325a-325c gets deactivated after a predetermined period of time.

The method enables displaying information related to the fluid level in the above-ground storage tank 310 in a simple, quick and cost-effective way. The proposed method assists in avoiding an operator intervention (or user intervention) for determining the fluid level in the above-ground storage tank 310 and enhances the safety of the operator. Although the method has been described with respect to only one fluid (i.e., the first fluid), however the same can be applied for multiple fluids (second fluid, third fluid, and so on so forth) without any limitations. Further, visual observations of the systems and devices according to the invention can be enhanced with drone or satellite observation.

Unless otherwise defined, all technical and scientific terms used herein have the same meaning as commonly understood by one of ordinary skill in the art to which this invention belongs. Although systems, methods and materials similar to or equivalent to those described herein can be used in the practice or testing of equivalent systems and methods, suitable systems and methods and are described above.

Although the invention has been described and illustrated with specific illustrative embodiments, it is not intended that the invention be limited to those illustrative embodiments. Those skilled in the art will recognize that variations and modifications can be made without departing from the spirit of the invention. Therefore, it is intended to include within the invention, all such variations and departures that fall within the scope of the appended claims and equivalents thereof.

What is claimed is:

1. A system for displaying information related to a fluid level in an above-ground storage tank, comprising:
    the above-ground storage tank adapted to store a predefined level of multiple types of fluids, wherein the predefined level of the multiple types of fluids is from 400 gallons to 30,000,000 gallons; and
    at least one sensor located at the above-ground storage tank, the at least one sensor being adapted to detect a first fluid from the multiple types of fluids and a first level of the first fluid to define a first detected fluid level,
    wherein the at least one sensor is in communication with a fluid indicator,
    wherein the fluid indicator comprises a plurality of lights arranged proximate to an exterior surface of the above-ground storage tank, wherein the plurality of lights is arranged such that when a first proportion of a light is electrified and illuminated, the illumination visually indicates the first detected fluid level, and wherein the at least one sensor is adapted to detect a second fluid from the multiple types of fluids and a second level of the second fluid to define a second detected fluid level, and wherein a first color of the plurality of lights indicates at least one of a status of the first fluid from the multiple types of fluids and a type of the first fluid at a first defined volume, and a second color of the plurality of lights indicates a status of the second fluid from the multiple types of fluids and a type of the second fluid at a second defined volume.

2. The system of claim 1 wherein the plurality of lights is arranged linearly and vertically up-and-down on the exterior surface of the above-ground storage tank.

3. The system of claim 1 further comprising a power source coupled to a controller that is in communication with the at least one sensor and the fluid indicator.

4. The system of claim 3 wherein the controller is communicatively coupled with one of a server and a user device, wherein one of the server and the user device is adapted to generate a first communication message to a user, wherein the first communication message comprises a warning related to a predefined unsafe condition.

5. The system of claim 1 wherein the plurality of lights comprises light emitting diode (LED) lights.

6. The system of claim 1 wherein the second fluid is a gas.

7. The system of claim 1 wherein a predefined color of a second plurality of lights indicates a first error in the system.

8. The system of claim 1 wherein a predefined color of a second plurality of lights indicates a first known error type in the system.

9. The system of claim 1 wherein the fluid indicator is coupled to the exterior surface of the above-ground storage tank via a first connecting unit.

10. The system of claim 1 wherein the fluid indicator comprising the plurality of lights is adapted to be activated by a controller, and is adapted to activate the fluid indicator for a predefined period of time.

11. The system of claim 1 wherein the fluid indicator is at least one of a continuous fluid indicator, and a segmented fluid indicator.

12. The system of claim 1 wherein the fluid indicator is located in a fluid indicator track, wherein the fluid indicator track is coupled to the above-ground storage tank via a mounting unit.

13. The system of claim 1 wherein the above-ground storage tank is an industrial container that is adapted to store a petroleum-based liquid.

14. A method for conveying information regarding a status of an interior volume of an above-ground storage tank, comprising:

providing the above-ground storage tank having therein a first sensor adapted to detect a first fluid from multiple types of fluids and a first level of the first fluid to define a first detected fluid level, wherein a predefined level of the multiple types of fluids in the above-ground storage tank is from 400 gallons to 30,000,000 gallons, wherein the first sensor is not located at the bottom of the first fluid and is adapted to communicate with a fluid indicator, wherein the fluid indicator comprises a plurality of lights arranged proximate to an exterior surface of the above-ground storage tank;

communicating the first level of the first fluid from the multiple types of fluids from the first sensor to the fluid indicator;

activating at least one light from the plurality of lights to display a predetermined color associated with the first fluid from the multiple types of fluids and the first level of the first fluid from the multiple types of fluids; and, wherein the first sensor is adapted to detect a second fluid from the multiple types of fluids and a second level of the second fluid to define a second detected fluid level, and wherein a first color of the plurality of lights indicates at least one of a status of the first fluid from the multiple types of fluids and a type of the first fluid at a first defined volume, and when powered a second color of the plurality of lights indicates a status of the second fluid from the multiple types of fluids and a type of the second fluid at a second defined volume.

15. The method of claim 14 further comprising detecting, by the first sensor, a first known error type in a system and a first error in the system.

16. The method of claim 14 further comprising:

detecting an empty portion of the above-ground storage tank by the first sensor; and communicating the second detected fluid level from the multiple types of fluids by the first sensor to the fluid indicator.

17. The system of claim 1 wherein the second fluid is a liquid.

18. The method of claim 14 wherein the second fluid is a gas.

19. The method of claim 14 wherein the second fluid is a liquid.

20. The method of claim 14 further comprising deactivating the at least one light from the plurality of lights after a predetermined period of time.

* * * * *